United States Patent [19]
Silverstrim et al.

[11] Patent Number: 5,601,643
[45] Date of Patent: Feb. 11, 1997

[54] FLY ASH CEMENTITIOUS MATERIAL AND METHOD OF MAKING A PRODUCT

[75] Inventors: Thomas Silverstrim, Collingdale; Hossein Rostami, Philadelphia, both of Pa.; Jesus Larralde, Clovis, Calif.; Anamolah Samadi, Philadelphia, Pa.

[73] Assignees: Drexel University, Philadelphia; By-Products Development Co., Collingdale, both of Pa.

[21] Appl. No.: 649,413

[22] Filed: May 16, 1996

Related U.S. Application Data

[63] Continuation of Ser. No. 507,096, Jul. 26, 1995, abandoned, which is a continuation of Ser. No. 389,850, Feb. 17, 1995, abandoned.

[51] Int. Cl.$^6$ .................................................. C04B 12/04
[52] U.S. Cl. .......................... 106/624; 106/606; 106/631; 106/DIG. 1
[58] Field of Search .................................. 106/600, 606, 106/624, 631, DIG. 1

[56] References Cited

U.S. PATENT DOCUMENTS

| | | |
|---|---|---|
| 4,328,034 | 5/1982 | Ferguson . |
| 4,328,035 | 5/1982 | Ingles et al. . |
| 4,450,009 | 5/1984 | Childs et al. . |
| 4,461,644 | 7/1984 | Childs et al. . |
| 4,533,393 | 8/1995 | Neuschaeffer et al. . |
| 4,608,795 | 9/1986 | Neuschaeffer et al. . |
| 4,642,137 | 2/1987 | Heitzmann et al. . |
| 4,655,837 | 4/1987 | Jong . |
| 5,352,288 | 10/1994 | Mallow . |

OTHER PUBLICATIONS

P. Kumar Mehta, *Concrete Structure, Properties, and Materials,* Prentice–Hall, Inc., Englewood Cliffs, New Jersey, pp. 269–271 (1986); (no month).

B. Talling, "Effect of Curing Conditions on Alkali–Activated Slags," *Fly Ash, Silica Fume, Slag and natural Pozzolans in Concrete,* 2, Ed. V. M. Malhotra, pp. 1485–1500 (1989); (no month).

W. Jiang et al., "Hydrothermal Processing of New Fly Ash Cement," *Ceramic Bulletin,* 71, No. 4, pp. 642–647 (1992); (no month).

J. LaRosa et al., "Zeolite Formation in Class F Fly Ash Blended Cement Pastes," *J. Am. Ceram. Soc.,* 75, No. 6, pp. 1574–1579 (1992); (no month).

P. J. Tikalsky et al., "Influence of Fly Ash on the Sulfate Resistance of Concrete," *ACI Materials Journal,* 89, No. 1, pp. 69–75 (Jan.–Feb. 1992).

H. H. Shigemoto et al., "Selective Formation on Na–X–Zeolite From Coal Fly Ash by Fusion with Sodium Hydroxide Prior to Hydrothermal Reaction," *J. Mat. Sci.,* 28, 4781–4786 (1993); (no month).

J. Wastiels et al., "Mineral Polymer Based on Fly Ash," *Proceedings of the 9th International Conference on Solid Waste Management,* Widener University, Philadelphia, PA, 8 pages (1993); (no month).

D. M. Roy, "Advances and Applications in Cements/CBC's, Including Waste Management," *IUMRS* (in press, Tokyo, 1994), 19 pages; (no month).

D. M. Roy, "Chemical and Physical Properties of Cement Binders," *Solidification/Stabilization: Fundamentals, Case Studies and Regulations,* Houston, Texas, 21 pages (May 5–6, 1994).

*Modification by Admixtures: Chapter 13. Physical and Chemical Modification,* pp. 318–324 (date unknown).

*Primary Examiner*—Mark L. Bell
*Assistant Examiner*—Michael Marcheschi
*Attorney, Agent, or Firm*—Panitch Schwarze Jacobs & Nadel, P.C.

[57] ABSTRACT

Rapid curing, high strength cementitious binder mixtures are provided containing fly ash and an alkali metal or alkaline earth metal silicate binder that has a weight ratio of $SiO_2:M_2O$ of about 0.20:1 to about 0.75:1 wherein M is selected from the group consisting of Li, Na, K, ½Ca and ½Mg. The cementitious binder mixtures can be mixed with aggregates to provide mortar and concrete mixtures. Any of the binder, mortar and concrete mixtures can be cured under elevated temperatures to yield high strength products.

20 Claims, 3 Drawing Sheets

FLY ASH CEMENTITIOUS MATERIAL AND METHOD OF MAKING A PRODUCT

CROSS-REFERENCE TO RELATED APPLICATION

This application is a continuation of application Ser. No. 08/507,096, filed Jul. 26, 1995, which is a continuation of application Ser. No. 08/389,850, filed Feb. 17, 1995, both now abandoned.

FIELD OF THE INVENTION

The invention generally relates to cementitious materials. More particularly, the invention relates to chemically-activated fly ash cementitious materials.

BACKGROUND OF THE INVENTION

Portland cement concrete, although useful in building construction, is limited in its application due to its long curing time to attain a high compressive strength. Chemical additives, such as superplasticizers and curing accelerators added to Portland cement produce high early compressive strength but are expensive.

Fly ash which is landfilled or stored in surface impoundments presents environmental concerns associated with potential soil and ground water pollution. The art has attempted to address these concerns by admixing fly ash with Portland cement during production of concrete as a means to dispose of the fly ash.

P. Kumar Mehta et al., *Concrete Structure, Properties and Materials*, pages 269–271, (1986) teaches that fly ash can be mixed with Portland cement to improve the strength and chemical resistance of Portland cement concrete. Mixing fly ashes such as Class F and Class C fly ash with Portland cement has gained limited acceptance, however, because the low pozzolanic reactivity of fly ash tends to increase the setting time of the Portland cement concrete.

Setting time of fly ash Portland cement blends, however, can be shortened by alkali silicates. For example, Talling, B., "Effect of Curing Conditions on Alkali-Activated Slags", *Fly Ash, Silica Fume, Slag, and Natural Pozzolans in Concrete*, edited by V. M. Malhotra, pages 1485–1500, (1989), indicates that sodium silicate increases the rate of strength development in blast furnace slags.

J. Wastiels et al. "Mineral Polymer Based on Fly Ash", *Proceedings of the 9th International Conference on Solid Waste Management*, Widener University, Philadelphia, Pa. (1993), shows mixing fly ash and aqueous sodium silicate wherein the ratio of $SiO_2:Na_2O$ in the silicate solution is at least about 0.80:1. Although these compositions can be heat cured, the need for very large amounts of aqueous sodium silicate solutions which have very high $SiO_2:Na_2O$ ratios renders them slow curing.

A need therefore continues for cementitious materials which can rapidly achieve high compressive strength in shortened time periods.

SUMMARY OF THE INVENTION

The invention provides rapid curing, high strength cementitious mixtures comprising fly ash and alkali metal or alkaline earth metal silicate binder, hereafter referred to as CAFA binder mixture. The alkali metal or alkaline earth metal silicate binder has a weight ratio of $SiO_2:M_2O$ of about 0.20:1 to about 0.75:1, preferably about 0.5:1 to about 0.6:1, wherein M is any of Li, Na, K, ½Ca and ½Mg. Preferably, the fly ash is Class F or Class C fly ash, more preferably Class F fly ash. Preferably, the silicate binder comprises a sodium silicate component and a sodium hydroxide component. Preferably, the sodium silicate component is an aqueous solution that comprises about 38% to about 55% sodium silicate solids content and which has a $SiO_2:Na_2O$ ratio of about 2:1 to about 3.22:1, and about 45% to about 62% water based on the weight of the alkali silicate component, i.e., the aqueous sodium silicate solution. Preferably, the sodium hydroxide component comprises about 25% to about 100% sodium hydroxide and up to about 75% water based on the weight of the sodium hydroxide component.

The CAFA binder mixtures can be admixed with fine aggregates to provide CAFA mortar mixtures. The CAFA mortar mixtures can be combined with coarse aggregates, optionally with fibers, to provide CAFA concrete mixtures. Any of the CAFA binder, mortar and concrete mixtures can be cured at elevated temperatures of about 40° C. to about 120° C. to yield high strength products.

Having briefly summarized the invention, the invention will now be described in detail by reference to the following specification and non-limiting examples. Unless otherwise specified, all percentages are by weight and all temperatures are in degrees Celsius.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
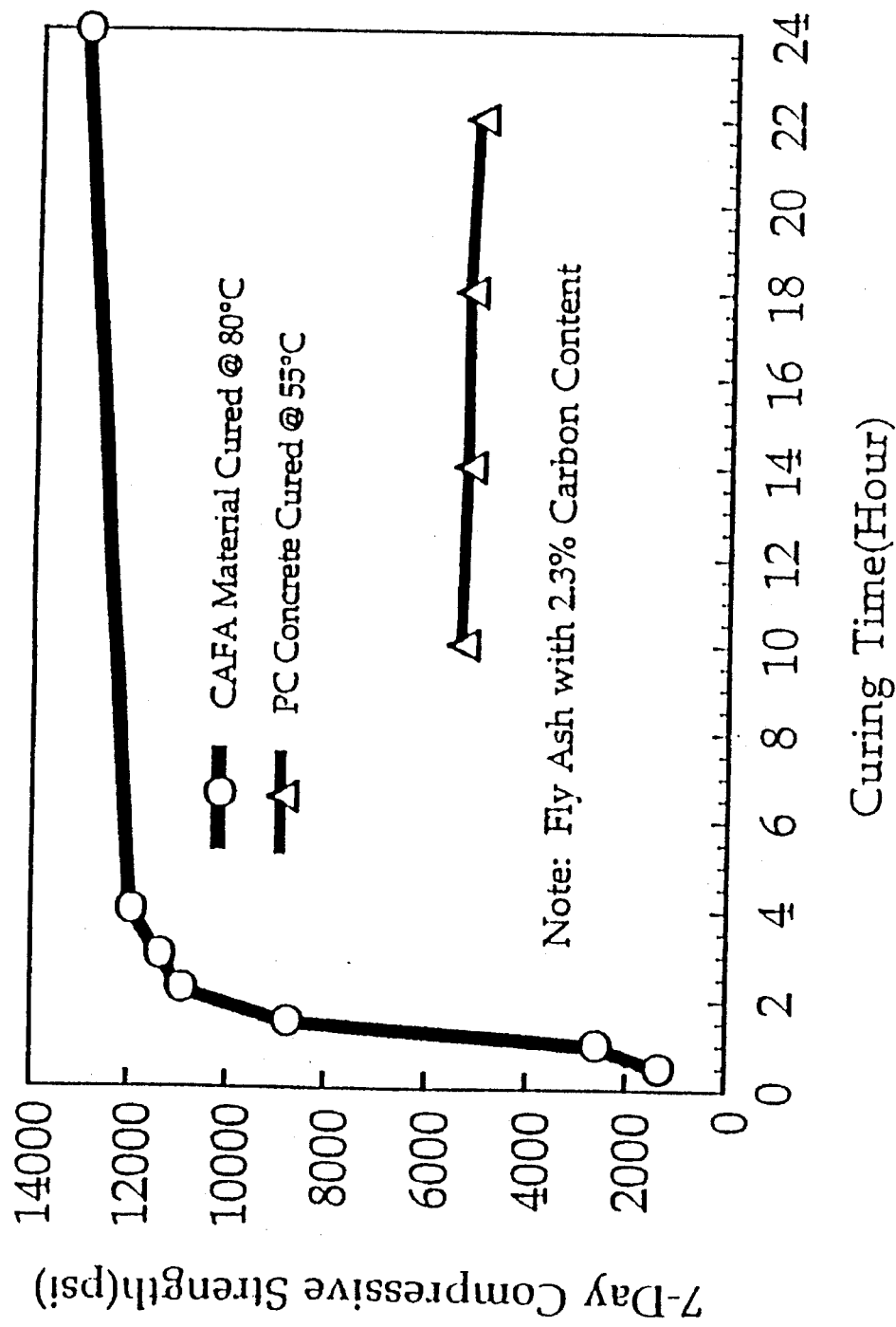
FIG. 1 shows the compressive strength of CAFA concrete mixtures of the invention relative to the compressive strength attained by Type III Portland cement concrete heat cured at 55° C.

The invention provides novel cementitious materials comprising fly ash mixed with alkali metal or alkaline earth metal silicate binder. The resultant CAFA binder mixture can be used alone. Alternatively, the CAFA binder mixture can be admixed with fine aggregates to provide CAFA mortar mixtures. Similarly, the CAFA mortar mixtures can be used alone, or further admixed with coarse aggregate as well as optional fibers to provide CAFA concrete mixtures. The CAFA binder mixtures, as well as the CAFA mortar mixtures and CAFA concrete mixtures, are hereinafter collectively referred to as CAFA compositions.

The CAFA compositions of the invention may employ any type of fly ash such as particulates separated from coal combustion flue gases, optionally mixed with silica fume and rice hull ash. Preferably, low carbon content fly ash, that is, fly ash which has less than about 6% carbon, is employed in the CAFA compositions. More preferably, at least one of Class C fly ash and Class F fly ash, most preferably Class F fly ash, is employed wherein Class C and Class F fly ash are as defined in ASTM C-618. Class F fly ash can be obtained from combustion of bituminous and anthracite coals. Class C fly ash can be obtained from combustion of sub-bituminous and lignite coals.

Typically, fly ashes such as Class C fly ash and Class F fly ash can be present in CAFA binder mixtures in amounts of from about 10% to about 90%. Preferably, Class F fly ash is present in an amount of about 60% to about 80% by weight based on the total weight of the CAFA binder mixture. Typically, about 90% of the Class F fly ash has a particle size having a major particle dimension less than about 100 microns.

The alkali metal or alkaline earth metal silicate binder employed in the CAFA binder mixtures is a mixture of an alkali metal or alkaline earth metal silicate component and an alkali metal or alkaline earth metal hydroxide component. References herein to "alkali" compounds, e.g., "alkali silicate", are intended to refer to alkali metals (e.g., Li, Na, K) and alkaline earth metal (e.g., Mg, Ca) compounds. The alkali silicate component comprises at least one of sodium silicate, potassium silicate, lithium silicate, calcium silicate or magnesium silicate. The alkali silicate component preferably comprises sodium silicate.

The alkali silicate component is typically used in the form of an aqueous solution. The alkali silicate component preferably comprises about 38% to about 55%, more preferably about 38 to about 39% alkali silicate solids, and about 45% to about 62%, more preferably about 61 to about 62% water based on the weight of the solution, i.e., the aqueous alkali silicate solution. Commercially available sodium silicate solutions which have a $SiO_2:Na_2O$ ratio of about 2:1 to about 3.22:1 can be used as the alkali silicate component. Sodium silicate solutions having ratios of $SiO_2:Na_2O$ within this range are available from the PQ Corporation, Valley Forge, Pa.

The alkali hydroxide component comprises at least one of sodium hydroxide, potassium hydroxide, lithium hydroxide and the like, preferably sodium hydroxide. The alkali hydroxide component can comprise about 25% to about 100%, preferably about 25% to about 75% sodium hydroxide, and up to about 75%, preferably about 25% to about 75% water based on the weight of the sodium hydroxide component.

The alkali silicate binder preferably is formed from about 25% to about 75% of the alkali silicate component and about 25% to about 75% of the alkali hydroxide component, based on the weight of the alkali silicate binder. The relative amounts of each component can be varied as long as the alkali silicate binder has a $SiO_2:M_2O$ weight ratio of about 0.20:1 to about 0.75:1 where M may be Li, Na, K, ½Mg or ½Ca. The alkali silicate binder preferably has a preponderance of monomeric silicate ions in solution. The alkali silicate binder typically has a pH of about 10 to about 14.6, with higher pH values in the range preferred.

CAFA binder mixtures can be made by mixing alkali silicate binder, fly ash and optional additional water. As used hereinafter, additional water is understood to mean water which is added to a CAFA composition in addition to water present in the alkali silicate binder. Special mixing procedures are not required to mix the alkali silicate binder, fly ash and additional water. The amounts of fly ash, additional water, fine aggregate and coarse aggregate, alkali hydroxide component and alkali silicate component employed to produce CAFA binder mixtures, CAFA mortar mixtures, and CAFA concrete mixtures are expressed below as based on the total weight of those mixtures, respectively. In addition, the amount of alkali silicate component included in those compositions is expressed below as based on the use of an aqueous alkali silicate component that is an aqueous alkali silicate solution which contains about 38% alkali silicate solids. Also, the amount of alkali hydroxide component in those compositions is expressed below as based on the use of an alkali hydroxide component that is a 50% aqueous alkali hydroxide solution which has about 50% NaOH solids.

CAFA binder mixtures can be prepared as described above with about 1% to about 50%, preferably about 2% to about 20%, more preferably about 10% to about 15% of the alkali silicate component; about 2% to about 20%, more preferably about 10% to about 15% of the alkali hydroxide component; up to about 10%, more preferably up to about 4% additional water, and about 15% to about 90%, more preferably about 60% to about 80% of the Class F fly ash. The percentages of these components, however, can vary in accordance with the solids contents of the alkali silicate and alkali hydroxide components.

Various additives may be included in the CAFA binder mixture to provide desired aesthetic properties as well as to improve strength development. Examples of these additives include but are not limited to coloring agents such as dyes. Additives useful for strength development include fine powders and aqueous solutions of multivalent compounds such as aluminates, ferrites, and calcium. These additives provide multivalent metal cations which function to decrease the solubility of the silicate structures present in the CAFA binder mixture to improve durability and weather resistance. Although slaked lime and calcareous products may be present in the CAFA binder mixture, their presence is not required.

Portland cement may be included in CAFA binder mixtures in amounts of up to about 15% by weight of the CAFA binder mixture. As used herein, Portland cement is understood to mean commercially available compositions of a calcium-based material which hardens through exothermic hydration wherein water reacts with the constituents of the cement. Typical Portland cement compositions include about 55% to about 65% CaO, about 17% to about 25% $SiO_2$, about 5% to about 10% $Al_2O_3$, with the remainder $Fe_2O_3$, $Na_2O$, $K_2O$, carbon, and insoluble materials.

CAFA mortar mixtures can be prepared by mixing CAFA binder mixtures with fine aggregate. Fine aggregate is understood to have a particle size range of about 0.25 mm to about 4 mm, and a particle size variation within that range conforming to ASTM C-33. CAFA mortar mixtures may be prepared by mixing about 30% to about 99%, preferably about 40% to about 60% CAFA binder mixture and about 1% to about 70%, more preferably about 40% to about 60% fine aggregate. Even more preferably, CAFA mortar mixtures may be prepared by mixing about 45% to about 55% CAFA binder mixture and about 45% to about 55% fine aggregate.

CAFA mortar mixtures thus can be mixed to include a broad range of amounts of fly ash, additional water, alkali silicate component, the alkali hydroxide component, and fine aggregate. CAFA mortar mixtures may be prepared with about 15% to about 60%, preferably about 25% to about 50%, more preferably about 30% to about 50% class F fly ash; up to about 10%, preferably up to about 5%, more preferably up to about 3% additional water; about 1% to about 20%, preferably about 2% to about 10% of the alkali silicate component; about 1% to about 20%, preferably about 2% to about 10% of the alkali hydroxide component; and about 0.1% to about 60%, preferably about 30% to about 60%, more preferably about 40% to about 60% fine aggregate. All percentages are based on the total weight of the CAFA mortar mixture.

CAFA concrete mixtures can be prepared by mixing a wide range of CAFA mortar mixtures, coarse aggregate and additional water. The amount of coarse aggregate in the CAFA concrete mixture is similar to the amount of coarse aggregate employed in Portland cement concrete. Useful coarse aggregates include common pebbles and stones of sizes comparable to those employed in manufacture of Portland cement concrete. Especially useful coarse aggregates are those which satisfy ASTM C-33.

CAFA concrete mixtures may be prepared with about 25% to about 99.9%, preferably about 40% to about 80%, more preferably about 45% to about 65% CAFA mortar mixture; about 0.1% to about 75%, preferably about 20% to about 60%, more preferably about 35% to about 55% coarse aggregate; and up to about 15%, preferably up to about 10%, more preferably up to about 5% additional water.

CAFA concrete mixtures can thus be prepared with a broad range of amounts of fly ash, additional water, alkali silicate component, alkali hydroxide component, fine aggregate, and coarse aggregate. CAFA concrete mixtures may be prepared with about 10% to about 90%, preferably about 15% to about 90%, more preferably about 15% to about 30%, even more preferably about 15% to about 25% Class F fly ash. Additional water may be used in an amount of up to about 10%, preferably about 3%. The alkali silicate component employed in the CAFA binder mixture may be used in an amount of about 1% to about 20%, preferably about 2% to about 4%. The alkali hydroxide component employed in the CAFA binder mixture may be used in an amount of about 1% to about 20%, preferably about 2% to about 4%. Fine aggregate may be used in an amount of about 1% up to about 85%, preferably about 20% to about 70%, more preferably about 25% to about 35%. Coarse aggregate may be used in an amount of about 1% to about 85%, preferably about 40% to about 60%, more preferably about 40% to about 50%. All percentages are based on the total weight of the CAFA concrete mixture.

CAFA concrete mixtures may employ fiber reinforcements. Useful fiber reinforcements include fibers such as steel, glass, polypropylene, graphite, carbon, high density polyethylene such as Spectra™ from E.I. DuPont de Nemours & Co., and aramid fibers such as Kevlar™ also available from E.I. DuPont de Nemours & Co. The type of reinforcing fibers employed depends on the properties desired in the final concrete product. For example, steel fibers can be employed to provide concrete products with increased fracture toughness.

Mixing of CAFA compositions is performed to yield a viscosity which is sufficiently low to permit conveying and casting of the CAFA compositions but high enough to prevent segregation of particulates therein. The viscosity of the CAFA compositions can be controlled by varying the amount and type of fly ash, the amounts of alkali silicate component and alkali hydroxide component in the alkali silicate binder, as well as the temperature of the alkali silicate binder. For example, increasing the amount of alkali silicate binder in the CAFA binder mixture reduces the viscosity of the CAFA binder mixture. Also, increasing the temperature of the alkali silicate binder reduces the viscosity of the CAFA binder mixture.

Any of the CAFA compositions can be cast into a variety of shapes. During casting, the CAFA compositions can be vibrated and tamped to eliminate air bubbles. Any of the cast CAFA compositions then can be heat cured to produce products having superior strength and pleasing aesthetic properties.

Cast CAFA compositions may be cured in place by heat lamps, insulating blankets, and the like, as well as by microwave heating. Heat curing of the CAFA compositions, however, typically is performed in an oven at about 40° C. to about 120° C., preferably about 50° C. to about 100° C., for a curing time sufficient to yield products with high compressive strength. As used herein, curing time is understood to mean the time required to drive off an amount of water sufficient to yield a self-supporting product. Curing time typically is about 1.5 hours to about 60 hours. Heat curing can be performed at a wide range of pressures varying from about 0.3 atmospheres to about 100 atmospheres. Preferably, heat curing is performed at atmospheric pressure.

The cast CAFA compositions, after heat curing at elevated temperatures to provide a hardened CAFA composition, are demolded and preferably maintained at room temperature at about 20% to about 30% relative humidity for a period of about one hour to about 31 days, preferably, about one hour to about seven days. The CAFA compositions, however, may be heat cured at elevated temperatures of about 40° C. to about 120° C., demolded, and further heat cured at less elevated temperatures of about 40° C. to about 70° C. Further heat curing at the less elevated temperatures may be useful to cure sealants or other surface treatment which may have been applied onto the hardened CAFA composition.

The cured CAFA compositions of the invention, as identified by X-ray diffraction, differ from unreacted fly ash. While not wishing to be bound by any particular theory, applicants believe that mixing fly ash with alkali silicate binder, and heat curing the resulting material in accordance with the invention, reduces the crystallinity of the quartz, mullite and other crystalline components of the fly ash to provide a new composition.

The invention is further illustrated by the following non-limiting examples:

EXAMPLES 1–2: CAFA Binder Mixtures

Sodium silicate binder is prepared by mixing sodium hydroxide component and sodium silicate component. The sodium hydroxide component is 50% aqueous sodium hydroxide that has a NaOH solids content of 50%. The sodium silicate component has 37.6% sodium silicate solids that has a $SiO_2:Na_2O$ ratio of 3.22:1, and 62.4% water. This sodium silicate is commercially available as Type N sodium silicate from PQ Corporation, Valley Forge, Pa. The resulting sodium silicate binder has 24.44% $Na_2O$, 13.96% $SiO_2$, a $SiO_2:Na_2O$ ratio of 0.57:1, and 61.6% $H_2O$. The sodium silicate binder is mixed with fly ash to yield the CAFA binder mixture of Table 1. The amounts of sodium hydroxide component and sodium silicate component employed to form the sodium silicate binder, as well as the amount of fly ash in the CAFA binder mixture, are given in Table 1 wherein the percentages are based on the total weight of the CAFA binder mixture.

TABLE 1

| Component | Amount (grams) | Wt. % |
|---|---|---|
| Sodium Hydroxide component | 741 | 14.82 |
| Sodium Silicate component | 702 | 14.03 |
| Class F Fly Ash[1] | 3557 | 71.15 |
| Additional Water | 0 | 0.0 |

[1]Carbon content = 2.3%

Two samples of the CAFA binder mixture of Table 1 are heat cured at 90° C. for 18 hours, and then removed to ambient conditions. At 2 days after casting, specimens are prepared in accordance with ASTM C-192 and ASTM C-617 for measurement of compressive strength. The specimens are tested for compressive strength according to ASTM C-39 2 days after casting. The compressive strengths are given in Table 1A.

TABLE 1A

| Example No. | Heat Curing Temperature (°C.) | Heat Curing Time (hrs.) | Compressive Strength (psi) |
|---|---|---|---|
| 1 | 90 | 18 | 12588 |
| 2 | 90 | 18 | 11174 |

EXAMPLES 3–7: CAFA Mortar Mixtures

Sodium silicate binder is prepared as in Examples 1–2 except that the amounts of the sodium hydroxide component and sodium silicate component of Table 2 are employed. The resulting sodium silicate binder has 22.96% $Na_2O$, 13.74% $SiO_2$, 63.3% $H_2O$, and a ratio of $SiO_2:Na_2O$ of 0.60:1. The sodium silicate binder is mixed with Class F fly ash, additional water, and fine aggregate in amounts sufficient to provide the CAFA mortar mixture shown in Table 2.

TABLE 2

| Component | Amount (grams) | Wt. % |
|---|---|---|
| Sodium Silicate component | 358 | 7.15 |
| Sodium Hydroxide component | 358 | 7.15 |
| Class F Fly Ash[1] | 1817 | 36.35 |
| Fine Aggregate | 2436 | 48.71 |
| Additional Water | 32 | 0.64 |

[1]Carbon content = 2.3%

Samples of the CAFA mortar mixture of Table 2 are cast, heat cured at 80° C. for various time periods, and removed to ambient conditions. Specimens for measurement of compressive strength are prepared as in Examples 1–2 but at days after casting. Compressive strength is measured as described in Examples 1–2 at 12 days after casting. The results are shown in Table 2A.

TABLE 2A

| Example No. | Heat Curing Temperature (°C.) | Heat Curing Time (hrs.) | Compressive Strength (psi) |
|---|---|---|---|
| 3 | 80 | 2 | 5287 |
| 4 | 80 | 3 | 7484 |
| 5 | 80 | 4 | 11624 |
| 6 | 80 | 8 | 13217 |
| 7 | 80 | 24 | 15764 |

EXAMPLE 8: CAFA Concrete Mixtures

Sodium silicate binder is prepared as in Examples 1–2 except that the amounts of the sodium hydroxide component and the sodium silicate component of Table 3 are employed. The resulting sodium silicate binder has 18.94% $Na_2O$, 10.7% $SiO_2$, 70.4% $H_2O$, and a ratio of $Si_2:Na_2O$ of 0.57:1. The sodium silicate binder is mixed with fly ash, additional water, as well as fine and coarse aggregates in amounts sufficient to provide a CAFA concrete mixture having the composition shown in Table 3.

TABLE 3

| Component | Amount (grams) | Wt. % |
|---|---|---|
| Sodium Hydroxide component | 185 | 3.69 |
| Sodium Silicate component | 172 | 3.45 |
| Additional $H_2O$ | 106 | 2.11 |
| Class F Fly Ash[1] | 1055 | 21.10 |
| Fine Aggregate | 1324 | 26.48 |
| Coarse Aggregate | 2158 | 43.17 |

[1]Carbon content = 2.3%

The CAFA concrete mixture is cast, heat cured at 50° C. for 18 hours, and then removed to ambient conditions. At 31 days after casting, a specimen for measurement of compressive strength is prepared as in Examples 1–2. Compressive strength is measured as described in Examples 1 and 2 except that compressive strength is measured at 31 days after casting. The result is shown in Table 3A.

TABLE 3A

| Heat Curing Temperature (°C.) | Heat Curing Time (hrs.) | Compressive Strength (psi) |
|---|---|---|
| 50 | 18 | 9119 |

FIG. 1 shows the compressive strengths attained at 7 days on samples of a CAFA mortar mixture having the same composition as Example 3 as a function of curing time at 80° C. relative to heat-cured Type III Portland cement concrete. The samples of the CAFA mortar mixtures are cured at 80° C. for the times indicated in FIG. 1, and then removed to ambient conditions for the remainder of the 7-day period. As shown in FIG. 1, samples cured at 80° C. for 24 hours achieve a compressive strength at 7 days of about 13,000 psi, and samples cured at 80° C. for 4 hours achieve a compressive strength at 7 days of about 12,000 psi. By comparison, the compressive strength for Portland cement concrete cured at 55° C. for 10–24 hours is about 5000 psi at 7 days after casting. The compressive strength obtained in CAFA mortar mixtures thus is about two to about three times greater than that of Portland cement concrete. Similar strength increases relative to Portland cement concrete are found at the end of 28 days.

The foregoing shows that the invention provides CAFA mixtures which develop compressive strength much more rapidly than Portland cement materials. Construction products which had previously required 24 hours to demold when employing Portland cement can now be demolded in about 1.5 to about 60 hours. This rapid strength development enables substantially increased output of production facilities.

Figure 2:
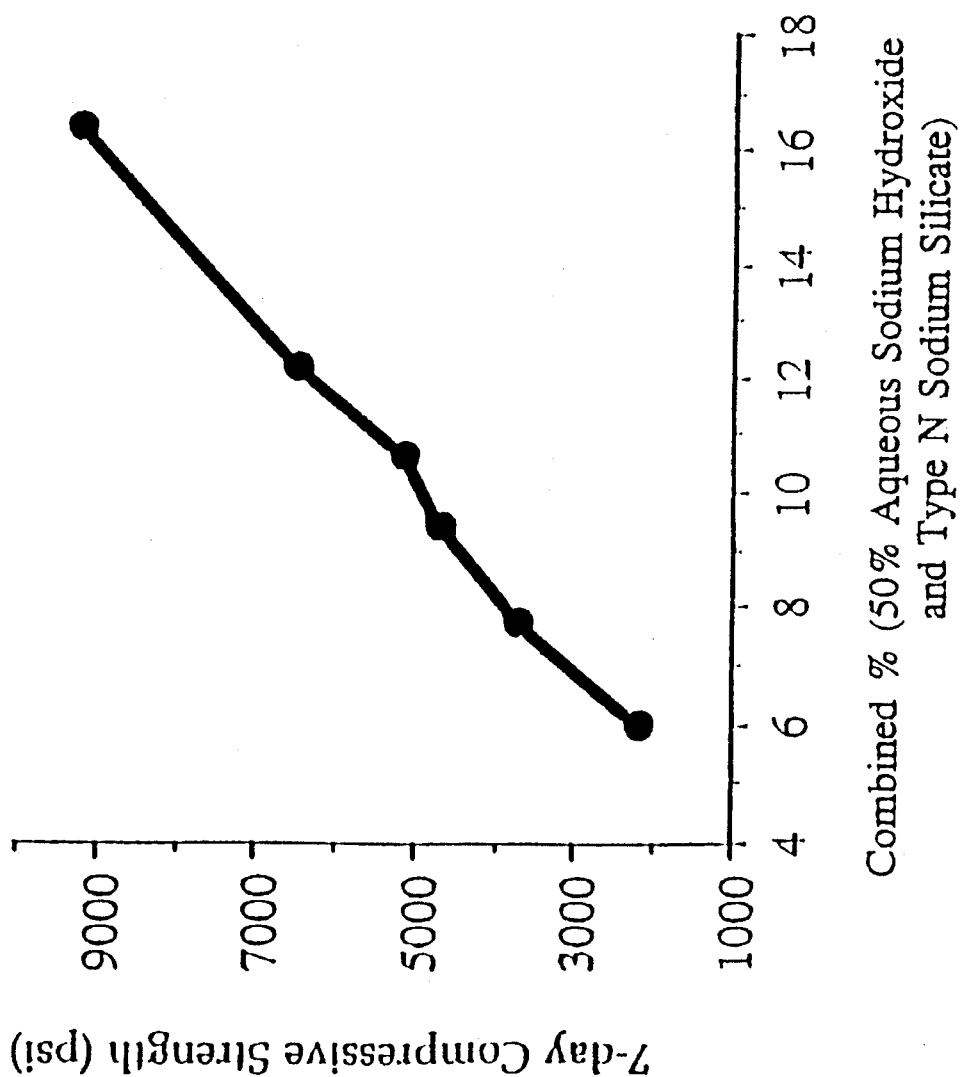
FIG. 2 shows the relationship between the combined amount of sodium silicate solutions and sodium hydroxide solutions in cured CAFA mortar mixtures and compressive strength.

The compressive strengths of the cured CAFA compositions of the invention vary with the amounts of the sodium hydroxide solids and the sodium silicate solids provided by the sodium hydroxide and sodium silicate components, respectively, in the CAFA composition, as shown in FIG. 2. The CAFA mortar mixtures of FIG. 2 are formed with a sodium silicate component that is type N sodium silicate from the PQ Corporation, Valley Forge, Pa., that has about 37.6% solids, and 50% aqueous sodium hydroxide that has about 50% NaOH solids. The CAFA mortar mixtures are cast and heat cured at 80° C. for 18 hours. The cured CAFA mortar mixtures then are removed to ambient conditions and tested 7 days after casting. As shown in FIG. 2, compressive strength increases as the combined amount of sodium silicate component and sodium hydroxide component in the CAFA mortar mixture increases.

Figure 3:
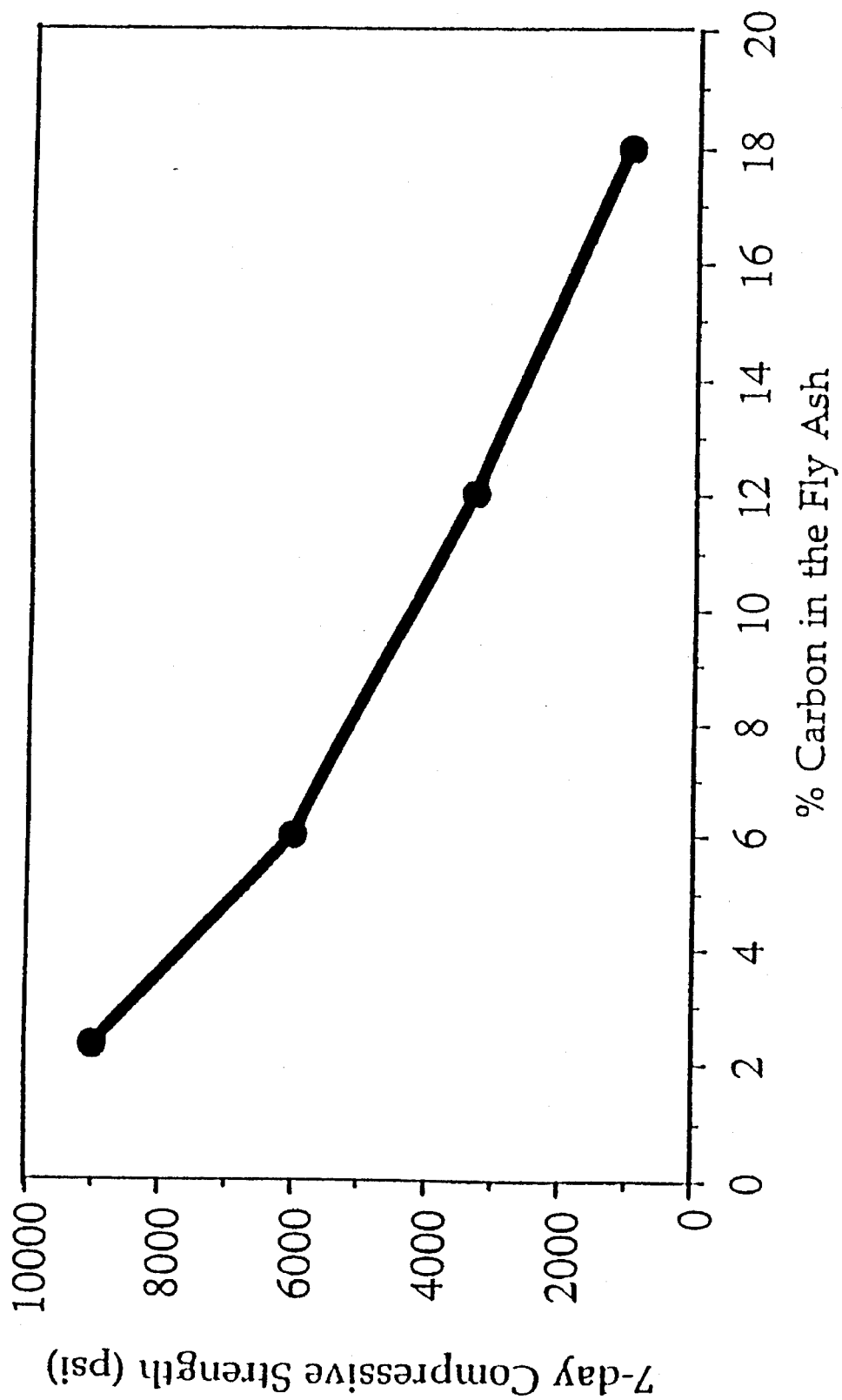
FIG. 3 shows the relationship between the carbon content of fly ash and compressive strength for CAFA mortar mixtures heat cured at 80° C.

The compressive strength of cured CAFA compositions of the invention is also sensitive to the amount of carbon in the fly ash employed. As shown in FIG. 3, the compressive strengths of CAFA compositions decrease as the percentage carbon increases. Accordingly, the carbon content in the fly ash employed preferably is less than about 6%, more preferably less than about 3%. The amount of alkali silicate and alkali hydroxide solids content in CAFA compositions can be increased to compensate for loss of compressive strength due to presence of carbon in the Fly ash.

Without wishing to be bound by any theory, the rapid increase in compressive strength during heat curing of the CAFA compositions of the invention is believed due to chemical activation and partial dissolution of fly ash within an aqueous alkali environment, as well as activation of the surface oxides of any aggregate particles present. When a CAFA composition is heat cured, the CAFA composition is believed to create a silicate gel which releases water. The released water is believed to cause polymerization of the silicates in the silicate gel to yield a stone-like matrix in which aggregate particles are integrally bound. The superior compressive strength of cured CAFA compositions is also believed due to the large amounts of aluminosilicate glass. Thus, in contrast to Portland cement, strength development is not believed to rely on slaked lime or calcareous products.

In addition to high compressive strength, the CAFA compositions of the invention also have low permeability. Permeability is an indication of the relative ease with which a material can become saturated with water, as well as the rate at which water can flow through that material. In order to assess the permeability of cured CAFA compositions, the cured CAFA concrete mixture of Example 8 is tested for permeability in accordance with ASTM C-5084-90. The cured CAFA concrete of Example 8, at 31 days after casting, is found to have a permeability of $9.54 \times 10^{-11}$ m/sec.

The CAFA mixtures of the invention may be employed in a variety of applications including cast construction products such as walls, floors, roads, and the like. Other uses include linings and coatings on objects such as pipes, rebar, walls, as well as coatings on electronic components. Other additional uses include, for example, abrasives.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A high strength cementitious binder mixture comprising fly ash and an alkali metal or alkaline earth metal silicate binder, the silicate binder comprising an alkali metal or alkaline earth metal silicate component and an alkali metal or alkaline earth metal hydroxide component wherein the silicate binder has a $SiO_2:M_2O$ weight ratio of about 0.20:1 to about 0.75:1, wherein M is selected from the group consisting of Na, Li, K, ½Ca and ½Mg and, further, wherein sufficient silicate binder is present to provide said cementitious binder mixture with a compressive strength after curing of at least about 2000 psi.

2. The cementitious binder mixture of claim 1 wherein M is Na and the alkali silicate component comprises an aqueous sodium silicate solution containing about 38% to about 55% sodium silicate solids content, a $SiO_2:Na_2O$ ratio of about 2:1 to about 3.22:1, and about 45% to about 62% water based on the weight of the aqueous sodium silicate solution, and the hydroxide component comprises about 25% to about 100% sodium hydroxide and up to about 75% water based on the weight of the hydroxide component.

3. The cementitious binder mixture of claim 1 wherein the fly ash is selected from the group consisting of Class C fly ash and Class F fly ash.

4. The cementitious binder mixture of claim 2 wherein the fly ash is Class F fly ash.

5. The cementitious binder mixture of claim 4 wherein the Class F fly ash is present in an amount of from about 15% to about 90% based on weight of the binder mixture.

6. The cementitious binder mixture of claim 5 wherein the Class F fly ash is present in an amount of about 60% to about 80%, and wherein the Class F fly ash has a carbon content of less than about 6%.

7. The cementitious binder mixture of claim 6 wherein the silicate component comprises about 2% to about 20% by weight of the cementitious binder mixture and the hydroxide component comprises about 2% to about 20% by weight of the cementitious binder mixture.

8. The cementitious binder mixture of claim 7 wherein the ratio of $SiO_2:M_2O$ in the silicate binder is about 0.5:1 to about 0.6:1.

9. The cementitious binder mixture of claim 1 further comprising Portland cement in an amount of up to about 15% by weight of the binder mixture.

10. A cementitious mortar mixture comprising the cementitious binder mixture of claim 2 and fine aggregate.

11. A cementitious concrete mixture comprising the cementitious mortar mixture of claim 10 and a reinforcement selected from the group consisting of coarse aggregate and fibers.

12. The cementitious concrete mixture of claim 11 comprising about 10% to about 90% Class F Fly Ash, about 1% to about 20% sodium hydroxide component, about 1% to about 20% sodium silicate component, up to about 10% additional water, about 18 to about 85% coarse aggregate, and about 1% up to about 85% fine aggregate based on the weight of the concrete mixture.

13. The cementitious concrete mixture of claim 11 wherein said fiber is selected from the group consisting of steel, glass, polypropylene, carbon, and high density polyethylene.

14. A method of manufacture of a high strength cured cementitious product comprising, forming a mixture comprising fly ash, and an alkali metal or alkaline earth metal silicate binder wherein the silicate binder has a weight ratio $SiO_2:M_2O$ of about 0.20:1 to about 0.75:1 wherein M is selected from the group consisting of Li, Na, K, ½Ca and ½Mg, and heat treating the mixture at a temperature of at least about 40° C. to obtain a high strength, cured cementitious product, wherein sufficient silicate binder is present in the mixture to provide a compressive strength in the cured cementitious product of at least about 2000 psi.

15. The method of claim 14 wherein the fly ash is selected from the group consisting of Class C fly ash and Class F fly ash.

16. The method of claim 15 wherein the Class F fly ash is present in the composition in an amount of from about 10% to about 90% based on weight of the mixture.

17. The method of claim 16 wherein the heat treating is performed at about 40° C. to about 120° C. for about 1.5 to about 60 hours.

18. The method of claim 17 wherein the ratio is about 0.5:1 to about 0.6:1.

19. A high pressure strength cementitious material comprising a heat cured reaction product of a mixture of fly ash selected from the group consisting of Class F fly ash and Class C fly ash, and an alkali metal or alkaline earth metal silicate binder wherein the silicate binder has a weight ratio $SiO_2:M_2O$ of about 0.20:1 to about 0.75:1, wherein M is selected from the group consisting of Li, Na, K, ½Ca and ½Mg and, further, wherein sufficient silicate binder is present to provide the cured reaction product with a compressive strength of at least about 2000 psi.

20. The high compressive strength cementitious material of claim 19 wherein the silicate binder comprises sodium silicate and sodium hydroxide.

* * * * *